United States Patent
Lin et al.

(10) Patent No.: US 12,015,542 B2
(45) Date of Patent: Jun. 18, 2024

(54) ENHANCING ROUTE SELECTION OF OPTIMIZED LINK STATE ROUTING USING A LINK PROBING TOOL

(71) Applicant: BAE Systems Information and Electronic Systems Integration, Inc., Nashau, NH (US)

(72) Inventors: Clifton A. Lin, Arlington, MA (US); Hema A. Retty, Jersey City, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 17/555,819

(22) Filed: Dec. 20, 2021

(65) Prior Publication Data

US 2023/0198890 A1    Jun. 22, 2023

(51) Int. Cl.
*H04L 45/12*    (2022.01)
*H04L 43/0864*    (2022.01)
(Continued)

(52) U.S. Cl.
CPC ........ *H04L 45/123* (2013.01); *H04L 43/0864* (2013.01); *H04L 43/12* (2013.01);
(Continued)

(58) Field of Classification Search
CPC ... H04L 45/123; H04L 43/0864; H04L 43/12; H04L 45/125; H04L 45/22; H04L 45/42;
(Continued)

(56) References Cited

U.S. PATENT DOCUMENTS

| 9,209,943 | B1 * | 12/2015 | Firoiu | H04L 1/1607 |
| 2005/0165901 | A1 * | 7/2005 | Bu | H04L 47/115 709/217 |

(Continued)

OTHER PUBLICATIONS

Badis et al., QoS for Ad hoc Networking Based on Multiple Metrics: Bandwidth and Delay, 2003 (Year: 2003).*

(Continued)

*Primary Examiner* — Abdulkader M Alriyashi
(74) *Attorney, Agent, or Firm* — Sand, Sebolt & Wernow LPA; Gary McFaline (57) ABSTRACT

A dynamic controlling framework that is adapted to dynamically optimize existing routing decisions in an optimized link state routing (OLSR) platform to favor higher-bandwidth, lower-latency links in the active link database. The dynamic controlling framework includes a link probing tool that is in communication with OLSR platform where the link probing tool is adapted to dynamically measure estimated bandwidth, latency scores, or both estimated bandwidth and latency scores of active links in the active link database of the OLSR platform. The dynamic controlling framework includes a plug-in framework that is in communication with the OLSR platform and the link probing tool where the plugin framework is adapted to receive at least one link quality multiplier (LQM) metric computed by the link probing tool and to combine the at least one LQM metric with the OLSR platform's existing link quality (LQ) metric for enhancing route selection by the OLSR platform.

6 Claims, 2 Drawing Sheets

(51) Int. Cl.
*H04L 43/12* (2022.01)
*H04L 45/00* (2022.01)
*H04L 45/125* (2022.01)
*H04L 45/42* (2022.01)

(52) U.S. Cl.
CPC ............ *H04L 45/125* (2013.01); *H04L 45/22* (2013.01); *H04L 45/42* (2013.01)

(58) Field of Classification Search
CPC . H04L 41/0823; H04L 43/0876; H04L 43/10; H04L 45/70; H04W 40/12
See application file for complete search history.

(56) References Cited

U.S. PATENT DOCUMENTS

2015/0333997 A1* 11/2015 Mermoud ............... G06F 13/00
370/252
2018/0295529 A1* 10/2018 Jen ........................ H04W 24/04

OTHER PUBLICATIONS

Pingb : Bandwidth Measuring Ping; https://www.florian.ca/pingb/ 1 page.

* cited by examiner

ENHANCING ROUTE SELECTION OF OPTIMIZED LINK STATE ROUTING USING A LINK PROBING TOOL

STATEMENT OF GOVERNMENT INTEREST

This invention was made with government support under Contract No. FA8750-16-C-0177 awarded by United States Air Force. The government has certain rights in the invention.

TECHNICAL FIELD

The present disclosure generally relates to controlling routing operations in communication networks. More particularly, the present disclosure generally relates to dynamically optimizing routing operations in communication networks. Specifically, the present disclosure generally relates to dynamically optimizing routing selections by favoring neighboring links with high bandwidth data rates and low latency times in an Optimized Link State Routing (OLSR) platform.

BACKGROUND

Standard OLSR platforms and/or implementations have been used in various industries for controlling routing operations in various communication networks, including military industries. One standard OLSR implementation is known as "olsrd" ("OLSR Daemon"). Standard OLSR platforms utilize link-state routing protocol to select routes based on a link quality (LQ) metric where the metric is defined as a percentage of control messages received over a link in a network. Standard OLSR platforms, such as olsrd, support configurations of link quality multipliers (LQM) as a way to apply a multiplier to its LQ metric.

Generally, this multiplier parameter can be applied on a per-link basis to include additional information and data to existing routing decisions provided in the OLSR platform. However, configuring these multipliers into OLSR platforms, such as olsrd implementations, with specific multiplier parameters must be performed via a static configuration when OLSR platform is not route operating. In other words, configuring these multipliers into standard OLSR platforms requires the network administrator to have prior knowledge of the network's link characteristics. While prior knowledge is acceptable for these situations, prior knowledge is usually impractical especially in an emergency situation where networks may need to be created quickly and network topologies are not known in advance.

SUMMARY

The presently disclosed dynamic controlling framework enhances standard OLSR platforms with the capability of dynamically optimizing routing selections by allowing the OLSR platforms to favor neighboring links with high bandwidth and low latency times over neighboring links with low bandwidth and high latency times in a network. The disclosed framework also removes the need of statically configuring multiplier parameter prior to routing selecting operations performed by the OLSR platforms. As such, the framework disclosed herein addresses some of the inadequacies of previously known techniques and frameworks for dynamically optimizing active links in a network.

In one aspect, an exemplary embodiment of the present disclosure may provide a system that has a plurality of links in a communication network. The system also has an optimized link state routing (OLSR) platform provided with at least one active link of the plurality of links, wherein the OLSR platform includes an active link database. The system also has a dynamic controlling framework in communication with the OLSR platform, wherein the dynamic controlling framework is adapted to dynamically optimize existing routing decisions in the OLSR platform to favor active links in the active link database.

This exemplary embodiment or another exemplary embodiment may further provide that the dynamic controlling framework further comprises a link probing tool in logical communication with the OLSR platform, wherein the link probing tool is adapted to dynamically measure at least one of estimated bandwidth or latency of the active links in the active link database. This exemplary embodiment or another exemplary embodiment may further provide that the dynamic controlling framework further comprises at least one series of pings transmitted via the link probing tool to each active link in the active link database, wherein the link probing tool is adapted to dynamically acquire one of the estimated bandwidth and latency from measuring a round-trip time of the at least one series of pings sent to each active link. This exemplary embodiment or another exemplary embodiment may further provide that the dynamic controlling framework further comprises a second series of pings transmitted via the link probing tool to each active link in the active link database, wherein the link probing tool is adapted to dynamically acquire one of the estimated bandwidth and latency from measuring a second round-trip time of the second series of pings sent to each active link. This exemplary embodiment or another exemplary embodiment may further provide that each ping of the at least one series of pings is about 20 bytes in size for dynamically acquiring the estimated latency of each active link, and wherein each ping of the second series of pings is about 20 kilobytes in size for dynamically acquiring the estimated bandwidth of each active link. This exemplary embodiment or another exemplary embodiment may further provide that the dynamic controlling framework further comprises at least one link quality multiplier (LQM) metric computed by the link probing tool for each active link in the active link database, wherein the at least one LQM metric is a weighted average of bandwidth and latency scores computed for each active link in the active link database. This exemplary embodiment or another exemplary embodiment may further provide that the dynamic controlling framework further comprises a plug-in framework in communication with the OLSR platform and the link probing tool, wherein the plugin framework is adapted to receive the at least one LQM metric from the link probing tool and to combine one or more desired routes with the OLSR platform for enhancing route selection by the OLSR platform. This exemplary embodiment or another exemplary embodiment may further provide that the plugin framework implements a HTTP server for accepting HTTP POST messages, wherein each POST message include the at least one LQM metric, at least one link IP address, and at least one local link name. This exemplary embodiment or another exemplary embodiment may further provide that the plurality of links has one or both of homogenous or heterogeneous radio links varying in latency.

In another aspect, an exemplary embodiment of the present disclosure may provide a dynamic controlling framework. The dynamic controlling framework has a link probing tool in communication with an optimized link state routing (OLSR) platform where the link probing tool is adapted to dynamically measure estimated bandwidth, latency, or both estimated bandwidth and latency of active links in the active link database of the OLSR platform. The dynamic controlling framework also has a plug-in framework in communication with the OLSR platform and the link probing tool, wherein the plugin framework is adapted to receive at least one link quality multiplier (LQM) metric computed by the link probing tool and to combine the at least one LQM metric with the OLSR platform for enhancing route selection by the OLSR platform.

This exemplary embodiment or another exemplary embodiment may further provide that the dynamic controlling framework further comprises at least one series of pings transmitted via the link probing tool to each active link in the active link database, wherein the link probing tool is adapted to dynamically acquire one of the estimated bandwidth and latency from measuring the round-trip time of the at least one series of pings sent to each active link. This exemplary embodiment or another exemplary embodiment may further provide that the dynamic controlling framework further comprises a second series of pings transmitted via the link probing tool to each active link in the active link database, wherein the link probing tool is adapted to dynamically acquire one of the estimated bandwidth and latency from measuring the round-trip time of the second series of pings sent to each active link.

In yet another aspect, an exemplary embodiment of the present disclosure may provide a method. The method comprises the steps of providing a dynamic controlling framework with an optimized link state routing (OLSR) platform on a plurality of links; effecting an active link database of the OLSR platform to be outputted to the dynamic controlling framework; effecting the dynamic controlling framework to dynamically measure one or both estimated bandwidth and latency of at least one active link of the active link database; effecting the dynamic controlling framework to compute at least one series of link quality multiplier (LQM) metrics on the active links of the active link database based on one or both of the estimated bandwidth and latency; effecting the OLSR platform to dynamically optimize existing routing decisions in the OLSR platform, via the at least one series of LQM metrics, to favor active links in the active link database.

This exemplary embodiment or another exemplary embodiment may further provide that the step of effecting the dynamic controlling framework to dynamically measure one or both estimated bandwidth and latency of each active link of the active link database at predetermined time periods is performed by a link probing tool of the dynamic controlling framework. This exemplary embodiment or another exemplary embodiment may further provide that the step of effecting the dynamic controlling framework to compute at least one series of LQM metrics on the active links of the active link database based on one or both of the estimated bandwidth and latency is performed by a link probing tool of the dynamic controlling framework. This exemplary embodiment or another exemplary embodiment may further provide steps of effecting a plugin framework of the dynamic controlling framework to receive the at least one series of LQM metrics from the link probing tool; and effecting the at least one series of LQM metrics to be outputted to the OLSR platform via the plugin framework. This exemplary embodiment or another exemplary embodiment may further provide steps of effecting at least one series of pings to be transmitted, via a link probing tool, to each active link in the active link database; effecting the link probing tool to measure a round-trip time of each ping of the at least one series of pings sent to each active link; and effecting the link probing tool to calculate latency scores of each active link in the active link database based on the round-trip time of each ping of the at least one series of pings. This exemplary embodiment or another exemplary embodiment may further provide steps of effecting a second series of pings to be transmitted, via the link probing tool, to each active link in the active link database; effecting the link probing tool to measure a second round-trip time of each ping of the second series of pings sent to each active link; and effecting the link probing tool to calculate bandwidth scores of each active link in the active link database based on the round-trip time of each ping of the second series of pings. This exemplary embodiment or another exemplary embodiment may further provide steps of effecting the link probing tool to compute the at least one series of LQM metrics by averaging the estimated bandwidth and latency scores measured for each active link in the active link database. This exemplary embodiment or another exemplary embodiment may further provide a step of effecting the plugin framework to dynamically update the at least one series of LQM metrics in the OLSR platform.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
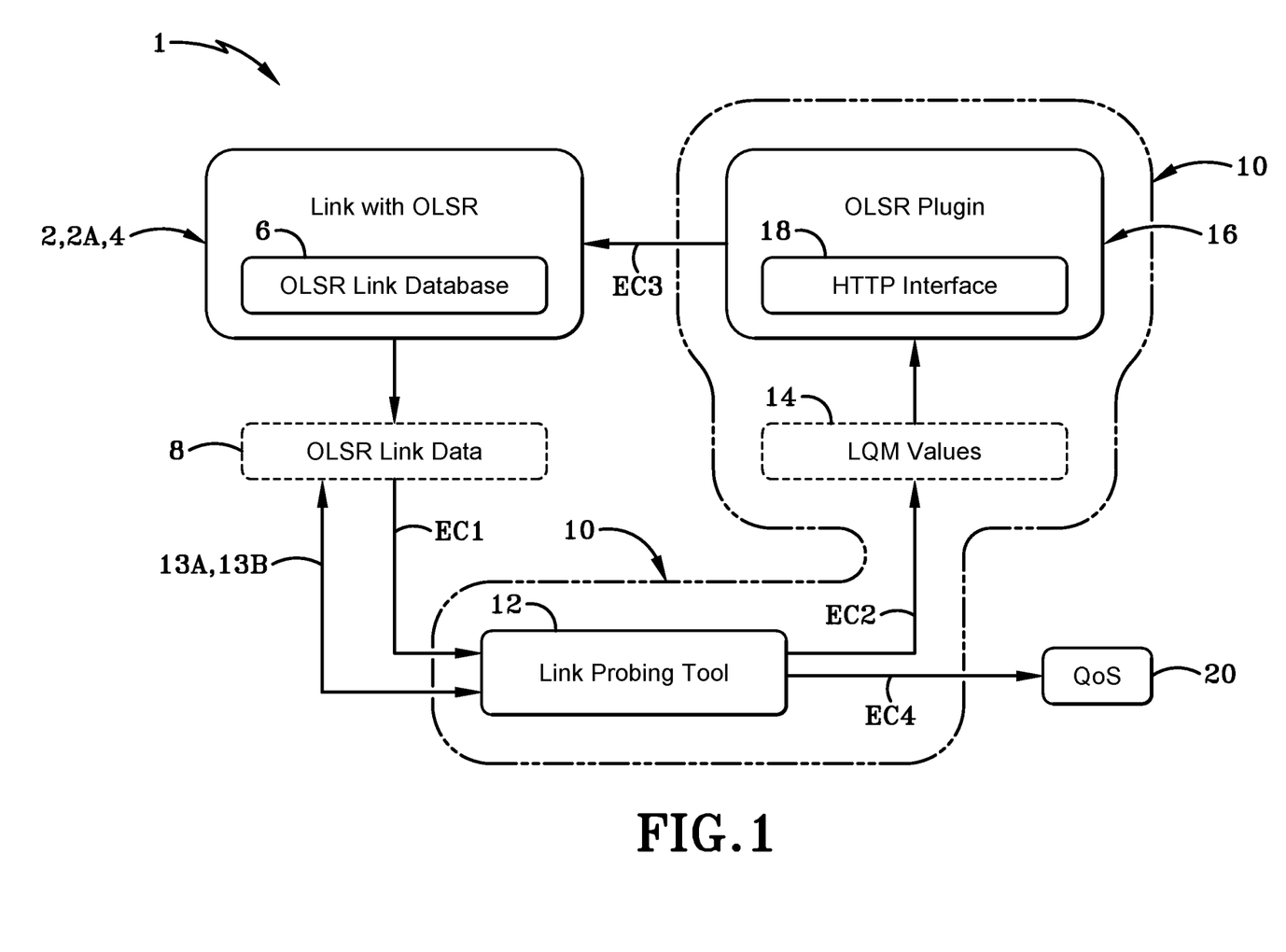
FIG. 1 is a diagrammatic flowchart of a dynamic controlling framework in accordance with an aspect of the present disclosure, wherein the dynamic controlling framework in communication with an Optimal Link State Routing (OLSR) platform provided on each link of a plurality of links in a communication network.

FIG. 1 illustrates a network or communication network with controlled routing operations for links and/or nodes on said network; the network is generally referred to as 1. The network 1 may be any suitable communication network with controlled routing operations for links and/or nodes on said network. Examples of suitable communication networks include wireless mesh networks, wireless ad-hoc networks, and other suitable communication networks with controlled routing operations for links and/or nodes on said networks.

Still referring to FIG. 1, the network 1 may include a plurality of links, nodes, or neighbors controlled in the network 1, which is generally referred to as 2. For simplification, a single link 2A of the plurality of links 2 in the network 1 is shown in FIG. 1. Each link of the plurality of links 2 may operate as both hosts (i.e., each link is an end-point of a communication) and as routers in the network 1. Each link of the plurality of links 2 may be any suitable device or machine that is capable of being controlled by the network 1. Examples of suitable devices or machines capable of being controlled in a network include mobile devices (i.e., smartphones, tablets, computers, etc.), surveillance monitoring devices, wearable military devices, military vehicles or platforms, and other suitable devices or machines capable of being controlled in a network.

Still referring to FIG. 1, each link of the plurality of links 2 runs on or uses an optimized link state routing (OLSR) protocol implementation or platform (hereinafter "OLSR platform"), which is generally referred to as 4 in FIG. 1. The OLSR platform 4 provided herein is adapted to select desired routes through specific links of the plurality of links 2 based on a set of link quality multiplier (LQM) metrics, which is described in more detail below. Generally, the OLSR platform's existing link quality (LQ) metric of each link of the plurality of links 2 is defined as a percentage of control messages received by each link of the plurality of links 2 to allow for discovery and dissemination of link state information throughout the network 1. The OLSR platform multiplies this existing LQ metric by the link quality multiplier (LQM) metric to obtain an optimized LQ metric. Such use of the LQM metric for each link of the plurality of links 2 can be applied on a per-link basis in order to influence the existing routing decisions in a OLSR platform 4, which is described in more detail below.

In the illustrated embodiment, the OLSR platform 4 described herein is an OLSR Daemon platform (also known as "olsrd" platform). While the OLSR platform 4 described herein is an OLSR Daemon platform, any suitable OLSR platforms, implementations, or versions may be used based on various considerations.

Additionally, the OLSR platform 4 includes an active link database 6. As provided herein, the active link database 6 of the OLSR platform 4 provides status of each link that is active in the plurality of links 2 of the network 1. The OLSR platform 4 is able to send or output these statuses of the active links in the plurality of links 2 of the networks 1 via active link data 8, which is described in more detail below. As provided herein, OLSR platform 4 is running on a JSON (JavaScript Object Notation) format that allows a user of the OLSR platform 4 to retrieve and extract the active link data 8 from the active link database 6 to be sent to external plug-ins or frameworks in logical communication with the OLSR platform 4. In other exemplary embodiments, any suitable format may be used to run an OLSR platform including, but not limited to, CSV (Comma-separate values), XML (Extensive markup language), another suitable formats that may be used to run an OLSR platform.

Still referring to FIG. 1, the OLSR platform 4 may be in logical communication with a dynamic controlling framework, which is generally referred to as 10. As provided herein, the dynamic controlling framework 10 is adapted to dynamically optimize the existing routing decisions in the OLSR platform 4 to favor active links in the active link database 6 of the plurality of links 2 via optimized LQMs. Specifically, the dynamic controlling framework 10 is configured to optimize LQMs of active links in the active link database 6 of the plurality of links 2 by measuring estimated bandwidth and estimated latency of each active link in the active link database 6 in real-time. Such real-time estimations of bandwidth and estimated latency of each active link in the active link database 6 are incorporated into the existing routing decision in the OLSR platform 4. With this incorporation of estimated bandwidth and estimated latency of each active link in the active link database 6 in real-time, the OLSR platform 4 may select and prioritize active links in the active link database 6 with high bandwidth and low latency over active links in the active link database 6 with low bandwidth and high latency.

In the illustrated embodiment, the dynamic controlling framework 10 is configured to be executable on the OLSR platform 4, which is an OLSR Daemon implementation. In other exemplary embodiments, a dynamic controlling framework may be able to be executable on other suitable OLSR platforms, implementations, or versions.

Still referring to FIG. 1, the dynamic controlling framework 10 includes a link probing tool 12. The link probing tool 12 is in logical communication with the OLSR platform 4 and the active link database 6 of the OLSR platform 4 via a first electrical connection "EC1". As provided in FIG. 1, the OLSR platform 4 is adapted to send or output the active link data 8 of the active link database 6 to the link probing tool 12 via the via the first electrical connection "EC1". Upon receiving the active link data 8, the link probing tool 12 is adapted to calculate estimated bandwidth and latency scores of the active links in the plurality of links 2 via series of different pings, which is described in more detail below. Additionally, the link probing tool 12 operates and/or runs on a separate process on each link of the plurality of links 2. As illustrated in FIG. 1, the link probing tool 12 runs on a process separate from the first link 2A of the plurality of links 2 when measuring the estimated bandwidth and latency of the first link 2A.

During operation, the link probing tool 12 is configured to probe each active link in the active link database 6 via at least one series of Internet Control Message Protocol (ICMP) probes 13 (or pings) sent to each link in the plurality of links 2. In the illustrated embodiment, a first series of pings 13A are sent to each active link based on the active link data 8 to measure estimated latency. Specifically, the link probing tool 12 dynamically estimates the latency by measuring a first round-trip time for each ping of the first series of pings 13A sent to each active link from the active link data 8. Each ping of the first series of pings 13A sent to each active link in the active link data 8 has a first byte size. In one exemplary embodiment, the first byte size of each ping of the first series of pings 13A is about 20 bytes in size. In addition, the link probing tool 12 may apply exponential smoothing to help stabilize link quality multiplier (LQM) and link quality (LQ) metrics and avoid route flapping during these probing operations.

Additionally, a second series of pings 13B are sent to each active link based on the active link data 8 to measure estimated bandwidth. Specifically, the link probing tool 12 dynamically estimates the bandwidth by measuring a second round-trip time for each ping of the second series of pings 13B sent to each active link in the active link data 8. Each ping of the second series of pings 13B sent to each active link in the active link data 8 may have a second byte size that is greater than the first byte size of each ping in the first set of pings 13A. In one exemplary embodiment, the second byte size of each ping of the second series of pings 13B is about 10 kilobytes in size. In addition, the link probing tool 12 may apply exponential smoothing to help stabilize link quality multiplier (LQM) and link quality (LQ) metrics and avoid route flapping during these probing operations.

As for the first and second series of pings 13A, 13B, the link probing tool 12 is adapted to use source routing rules when transmitting first and second series of pings 13A, 13B to each active link in the active link database 6. Such use of source routing rules ensures that each ping of the first and second series of pings 13A, 13B replies a return on the same active link in the active link database 6 to avoid replying a return on a different active link in the active link database 6.

Upon measuring the estimated latency and bandwidth of each active link in the active link database 6 via the first and second series of pings 13A, 13B, the link probing tool 12 averages the first and second series of pings 13A, 13B sent to each active link in the active link database 6. As illustrated in FIG. 1, the link probing tool 12 computes the average of the first series of pings 13A subsequent the measurement of the first link 2A in the OLSR platform 2 to estimate the latency of the first link 2A. Similarly, the link probing tool 12 also computes the average of the second series of pings 13B subsequent the measurement of the first link 2A in the OLSR platform 2 to estimate the bandwidth of the first link 2A. The link probing tool 12 may continue this computation of averaging the first and second series of pings 13A, 13B for the remaining active links in the active link database 6.

Subsequent to the computation of averaging the first and second series of pings 13A, 13B, the link probing tool 12 is also configured to compute an optimized LQM metric for each active link in the active link database 6 which is included in a series of optimized LQM messages 14. The LQM metrics in the series of optimized LQM messages 14 for the active link database 6 includes a normalized bandwidth score and a normalized latency score based on the measurements taken from the first and second series of pings 13A, 13B. In other words, the LQM metrics in the series of optimized LQM messages 14 for the active link database 6 includes a normalized bandwidth score and a normalized latency score based on the estimated bandwidth scores and latency scores measured from the round-trip times for each ping of the first and second series of pings 13A, 13B. As such, each normalized bandwidth score and normalized latency score is scored between a value range of about 0.0 up to about 1.0. For example, high latency dwell times and low bandwidths for a given link in the active link database 6 measured by the link probing tool 12 will score towards the 0.0 value as compared to low latency dwell times and high bandwidths for a given link in the active link database 6 measured by the link probing tool 12 will score towards the 1.0 value. Upon the computation of the normalized bandwidth score and normalized latency score for each active link in the active link database 6, the normalized bandwidth score and normalized latency score for each active link in the active link database 6 will be averaged together to provide a weighted average for each active link in the active link database 6. As described in more detail below, the weighted average for each active link in the active link database 6 as computed by the link probing tool will dynamically optimize the routing decisions for the OLSR platform 4.

Such measurement and computation by the link probing tool 12 on the active link database 6 is considered advantageous at least because the link probing tool 12 is able to dynamically evaluate and assess the bandwidth and latency of the active links in the active link database 6 without modifying the OLSR platform 4. In other words, the link probing tool 12 is able to leverage the existing OLSR platform 4 by factoring in real-time evaluations and estimates of bandwidth and latency of each active link in the active link database 6. Such dynamic factoring of bandwidth and latency, via calculation of bandwidth and latency scores, removes the user's static interaction and/or manipulation of existing implementation for modifying or factoring in additional parameters into an OLSR platform (i.e., modifying static configuration files by the network administrator having prior knowledge of the network's link characteristics).

Referring to the series of optimized LQM messages 14, each LQM message in the series of optimized LQM messages 14 includes additional active link information along with the LQM metric computed by the link probing tool 12 for each active link in the active link database 6. Each LQM message in the series of optimized LQM messages 14 may include a remote Internet Protocol (IP) address for a respective active link measured by the link probing tool 12, a local device name for the respective active link measured by the link probing tool 12, and the LQM metric computed by the link probing tool 12 for measuring the estimated bandwidth and latency for the respective active link.

Referring to FIG. 1, the dynamic controlling framework 10 includes a custom LQM plug-in framework or plug-in framework 16. In the illustrated embodiment, the plug-in framework 16 is in logical communication with the link probing tool 12 via a second electrical connection "EC2" where the link probing tool 12 outputs the series of LQM messages 14 to the plug-in framework 16. In addition, the plug-in framework 16 is also in logical communication with the OLSR platform 4 via a third electrical connection "EC3" where the plug-in framework 16 outputs the series of LQM messages 14 to the OLSR platform 4 for optimizing the existing routing decisions for favoring specific active links in the active link database 6 per the series of LQM messages 14, which is described in more detail below.

As provided herein, the plug-in framework 16 is configured to dynamically control the series of LQM messages 14 computed by the link probing tool 12 once outputted and received by the plug-in framework 16. The plug-in framework 16 is able to dynamically control the series of LQM messages 14 by implementing a server 18, particularly a HTTP server, that accepts HTTP POST messages (i.e., the series of LQM messages 14) from the link probing tool 12. Upon receipt of this series of LQM messages 14, the plug-in framework 16 implements and posts this series of LQM messages 14 into the OLSR platform 4, specifically the active link database 6, due to the OLSR platform 4 and the plug-in framework 16 being in logical communication with one another via the HTTP server 18.

Such use of the plug-in framework 16 in the dynamic controlling framework 10 is considered advantageous at least because the plug-in framework 16 is able to communicate with the both OLSR platform 4 and the link probing tool 12 during operation. Since OLSR platform 4 and the link probing tool 12 are unable to communicate with one another in this illustrated embodiment, the plug-in framework 16 is able to accept the series of LQM metrics 14 created by the link probing tool 12 and implement such series of LQM metrics 14 into the OLSR platform 4 without manipulating or modifying the protocol or logical framework of the OLSR platform 4. Instead, the plug-in framework 16 is able to dynamically optimize and/or leverage the existing routing decisions provided in the OLSR platform 4 to allow the OLSR platform 4 to favor specific active links in the active link database 6 with higher weighted LQM metrics near or equal to 1.0 (i.e., high average bandwidth scores and low latency scores) over lower weighted LQM metrics near or equal to 0.0 (i.e., low average bandwidth scores and high latency scores) during routing operations.

In addition, the link probing tool 12 of the dynamic controlling framework 10 may be in logical communication with a quality-of-service (QoS) framework 20 via a fourth electrical connection "EC4". Specifically, the link probing tool 12 may export the measured bandwidth and latency data for consumption by QoS framework 20 or by other processes in the network 1. For example, the QoS framework 20 may attempt to rate-limit egress traffic based on estimated bandwidths of the active links in the active link database 6 to avoid overdriving queues in the network 1. An additional function of the QoS framework 20 is to ensure that the ping probe messages transmitted by the link probing tool 12 are given the highest priority over other network traffic in the network 1, in order to ensure accurate probe measurements.

Having now described the components and parts of the dynamic controlling framework 10 with a OLSR platform 4 operating on the plurality of links 2 of the network 1, the method of using of the dynamic controlling framework 10 is described in more detail below.

Prior to routing operation, the dynamic controlling framework 10 is operatively engaged with the OLSR platform 4 on each link of the plurality of links 2. As illustrated in FIG. 1, the OLSR platform 4 is able to output the active link data 8 of the active link database 6 to the link probing tool 12. Additionally, the OLSR platform 4 is also able to receive inputs (i.e., the series of LQM messages 14) from the plug-in framework 16 upon the measurement and computations performed by the link probing tool 12 on the active links provided in the active link database 6.

During routing operations, the OLSR platform 4 outputs the active link data 8 of the active link database 6 to the dynamic controlling framework 10, specifically to the link probing tool 12. Upon receiving the active link data 8, the link probing tool 12 begins by probing each active link of the plurality of links 2 in the network 1 for routing information based on the active link data 8. Specifically, the link probing tool 12 begins probing each active link in the plurality of links 2 in the network 1 by transmitting the first series of pings 13A to each active link of the plurality of links 2 in the network 1. During this probing operation, the link probing tool 12 is measuring the dwell time (i.e., the round-trip time) of each ping of the first series of pings 13A from the initial time of the ping being sent to a respective active link to the time upon receiving the ping from the respective active link. As stated previously, the first set of pings 13A transmitted by the link probing tool 12 are used to measure the estimated latency of the active links in the active link database 6.

Additionally, the link probing tool 12 may also begin probing each active link in the plurality of links 2 in the network 1 by transmitting the second series of pings 13B to each active link of the plurality of links 2 in the network 1; such transmission of the second series of pings 13B may be transmitted prior to the first series of pings 13A, simultaneously with the first series of pings 13A, concurrently with the first series of pings 13A, or subsequent to the first series of pings 13A. During this probing operation, the link probing tool 12 is measuring the dwell time (i.e., the round-trip time) of each ping of the second series of pings 13B from the initial time of the ping being sent to a respective active link to the time upon receiving the ping from the respective active link. As stated previously, the second set of pings 13B transmitted by the link probing tool 12 are used to measure the estimated bandwidth of the active links in the active link database 6.

In other exemplary embodiments, a link probing tool may transmit any suitable amount of pings for measuring latency and bandwidth data from active links provided in a OLSR platform based on various considerations, including the operation of the OLSR platform, the varying in latency and bandwidth data in active links, numerous heterogeneous radio links, and other suitable considerations for a particular application.

Upon measuring the estimated bandwidths and latency via the first and second sets of pings 13A, 13B, the link probing tool 12 then computes the average estimated bandwidth for each active link in the active link database 6 and the average estimated latency scores for each active link in the active link database 6. For example, the link probing tool 12 computes the average of the first series of pings 13A subsequent the measurement of the first link 2A in the OLSR platform 2 to estimate the latency of the first link 2A.

Similarly, the link probing tool 12 also computes the average of the second series of pings 13B subsequent the measurement of the first link 2A in the OLSR platform 2 to estimate the bandwidth of the first link 2A. The link probing tool 12 continues this computation of averaging the first and second series of pings 13A, 13B for the remaining active links in the active link database 6.

Subsequent to the computation of averaging the first and second series of pings 13A, 13B, the link probing tool 12 then computes an optimized LQM metric for each active link in the active link database 6, which is included in the series of LQM messages 14. The LQM metrics in the series of optimized LQM messages 14 for the active link database 6, such as first link 2A, includes a normalized bandwidth score and a normalized latency score based on the measurements taken from the first and second series of pings 13A, 13B. In other words, the LQM metrics in the series of optimized LQM messages 14 for the active link database 6 includes a normalized bandwidth score and a normalized latency score based on the estimated bandwidth scores and latency scores measured from the round-trip times for each ping of the first and second series of pings 13A, 13B. As such, each normalized bandwidth score and normalized latency score is scored between a value range of about 0.0 up to about 1.0. For example, high latency dwell times and low bandwidths for a given link in the active link database 6 measured by the link probing tool 12 will score towards the 0.0 value as compared to low latency dwell times and high bandwidths for a given link in the active link database 6 measured by the link probing tool 12 will score towards the 1.0 value.

Upon the computation of the normalized bandwidth score and normalized latency score for each active link in the active link database 6, the normalized bandwidth score and normalized latency score for each active link in the active link database 6 is then averaged together, via the link probing tool 12, to provide a weighted average for each active link in the active link database 6. The weighted average computed by the link probing tool 12 is also known as the LQM metric provided in the series of optimized LQM messages 14. As described in more detail below, the LQM metrics in the series of optimized LQM messages 14 for the active link database 6 are used by the OLSR platform 4 to optimize routing decisions by prioritizing higher LQM metrics over lower LQM metrics for routing data and information through the network 1.

Upon the computation of the series of optimized LQM messages 14, the series of optimized LQM messages 14 are then outputted from the link probing tool 12 to the plug-in framework 16, specifically the HTTP server 18 of the plug-in framework 16. Once received by the plug-in framework 16, the plug-in framework 16 is configured to output this series of optimized LQM messages 14 to the OLSR platform 4, specifically to the active link database 6.

Additionally, the series of LQM messages 14 may also be outputted from the link probing tool 12 to other processes in the network 1 such as the QoS framework 20. Such use of the QoS framework is described above.

Once outputted from the plug-in framework 16 to the OLSR platform 4, the series of optimized LQM messages 14 may be incorporated into the existing routing selections of the OLSR platform 4. Specifically, the LQM metric for each active link in the active link database 6 with its associated IP address and local device name may be incorporated into the existing routing selections of the OLSR platform 4. Once incorporated into the existing routing selections of the OLSR platform 4, the LQM metrics measured and computed by the link probing tool 12 may dynamically influence the existing routing selections of the OLSR platform 4 by favoring or prioritizing specific active links in the network 1 over other active links in the network 1. Such favoring or prioritizing occurs due the weighted averages of the estimated bandwidth and latency scores measured by the link probing tool 12. For example, the OLSR platform 4 will favor or prioritize an active link in the network 1 that has a LQM metric approximate to or equal to a value of 1.0 (i.e., high bandwidth and low latency time) over another active link in the network that has a LQM metric approximate to or equal to a value of 0.0 (i.e., low bandwidth and high latency time).

While not illustrated herein, the dynamic controlling framework 10 may measure and compute any suitable amounts of LQM metrics for optimizing the routing decisions for the OLSR platform 4. In one exemplary embodiment, a link probing tool may periodically probe active links in a network and periodically compute LQM metrics for optimizing routing selection of an OLSR platform through favoring and/or prioritizing active links in the network based on estimated bandwidth and latency scores. In another exemplary embodiment, a link probing tool may continuously probe active links in a network and continuously compute LQM metrics for optimizing routing selection of an OLSR platform through favoring and/or prioritizing active links in the network based on estimated bandwidth and latency scores.

Figure 2:
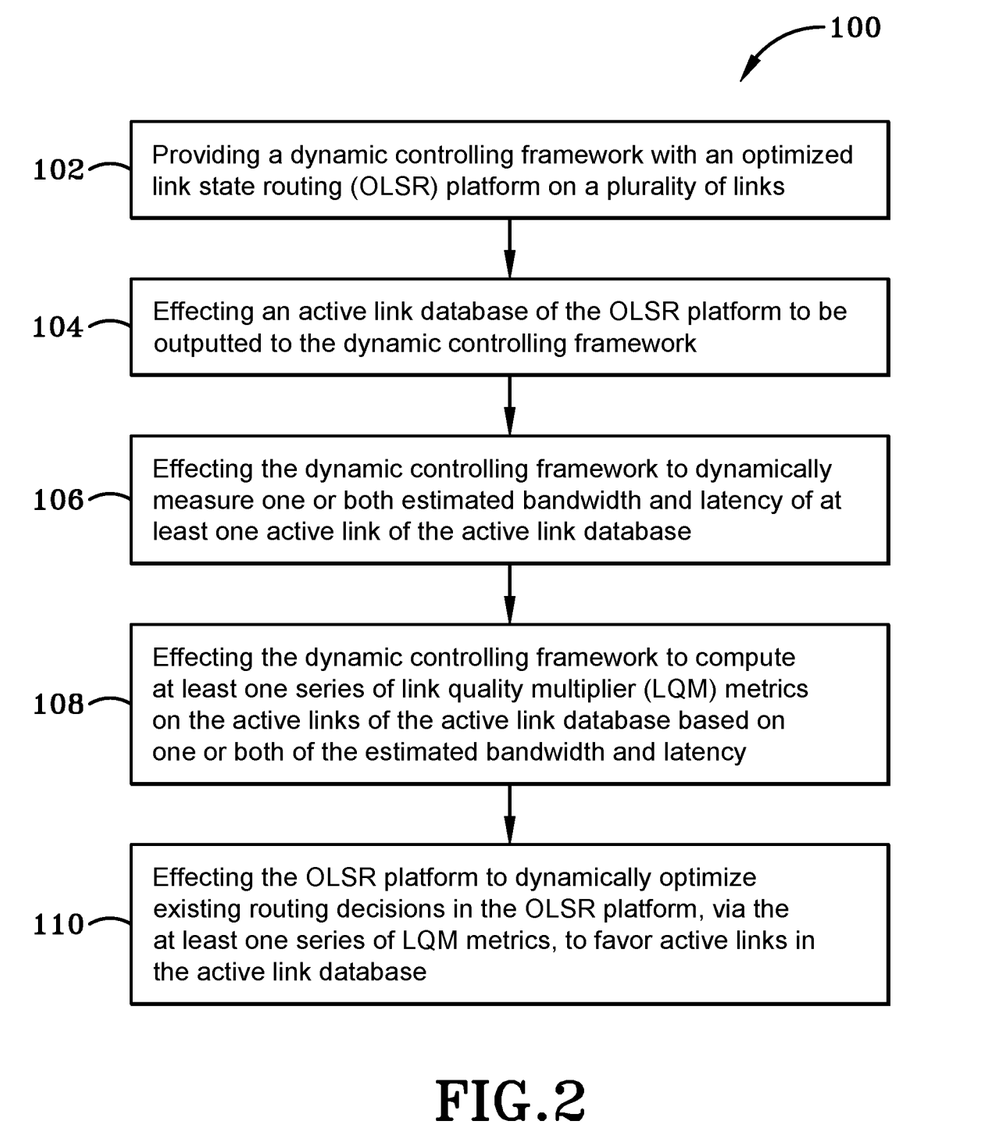
FIG. 2 is a method flowchart of dynamically optimizing existing routing decisions in an OLSR platform.

FIG. 2 illustrates a method 100. An initial step 102 of method 100 comprises providing a dynamic controlling framework with an optimized link state routing (OLSR) platform on a plurality of links. Another step 104 comprises effecting an active link database of the OLSR platform to be outputted to the dynamic controlling framework. Another step 106 comprises effecting the dynamic controlling framework to dynamically measure one or both estimated bandwidth and latency of at least one active link of the active link database. Another step 108 comprises effecting the dynamic controlling framework to compute at least one series of link quality multiplier (LQM) metrics on the active links of the active link database based on one or both of the estimated bandwidth and latency. Another step 110 comprises effecting the OLSR platform to dynamically optimize existing routing decisions in the OLSR platform, via the at least one series of LQM metrics, to favor active links in the active link database.

In other exemplary embodiments, method 100 may include additional steps. An optional step may further comprise that the step of effecting the dynamic controlling framework to dynamically measure one or both estimated bandwidth and latency of each active link of the active link database at predetermined time periods is performed by a link probing tool of the dynamic controlling framework. An optional step may further comprise that the step of effecting the dynamic controlling framework to compute at least one series of LQM metrics on the active links of the active link database based on one or both of the estimated bandwidth and latency is performed by a link probing tool of the dynamic controlling framework. Optional steps may comprise effecting a plugin framework of the dynamic controlling framework to receive the at least one series of LQM metrics from the link probing tool; and effecting the at least one series of LQM metrics to be outputted to the OLSR platform via the plugin framework. Optional steps may comprise effecting at least one series of pings to be transmitted, via a link probing tool, to each active link in the active link database; effecting the link probing tool to measure a round-trip time of each ping of the at least one series of pings sent to each active link; and effecting the link probing tool to calculate latency scores of each active link in the active link database based on the round-trip time of each ping of the at least one series of pings. Optional steps may comprise effecting a second series of pings to be transmitted, via the link probing tool, to each active link in the active link database; effecting the link probing tool to measure a second round-trip time of each ping of the second series of pings sent to each active link; and effecting the link probing tool to calculate bandwidth scores of each active link in the active link database based on the round-trip time of each ping of the second series of pings. Optional steps may comprise effecting the link probing tool to compute the at least one series of LQM metrics by averaging the estimated bandwidth and latency scores measured for each active link in the active link database. An optional step may comprise effecting the plugin framework to dynamically update the at least one series of LQM metrics in the OLSR platform.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A system, comprising:
    a plurality of links in a communication network;
    an optimized link state routing (OLSR) platform comprising one or more processors provided with at least one active link of the plurality of links, wherein the OLSR platform includes an active link database;
    a dynamic controlling framework in communication with the OLSR platform, wherein the dynamic controlling framework is adapted to dynamically optimize existing routing decisions in the OLSR platform to favor active links in the active link database; and
    a link probing tool in logical communication with the OLSR platform, wherein the link probing tool is adapted to dynamically measure at least one of estimated bandwidth or latency of the active links in the active link database;
    wherein the dynamic controlling framework further comprises:
        at least one series of pings transmitted via the link probing tool to each active link in the active link database, wherein the link probing tool is adapted to dynamically acquire one of the estimated bandwidth and latency from measuring a round-trip time of the at least one series of pings sent to each active link;
        a second series of pings transmitted via the link probing tool to each active link in the active link database, wherein the link probing tool is adapted to dynamically acquire one of the estimated bandwidth and latency from measuring a second round-trip time of the second series of pings sent to each active link; and
    wherein each ping of the at least one series of pings is about 20 bytes in size for dynamically acquiring the estimated latency of each active link, and wherein each ping of the second series of pings is about 20 kilobytes in size for dynamically acquiring the estimated bandwidth of each active link.

2. The system of claim 1, wherein the dynamic controlling framework further comprises:
    at least one link quality multiplier (LQM) metric computed by the link probing tool for each active link in the active link database, wherein the at least one LQM metric is a weighted average of bandwidth and latency scores computed for each active link in the active link database.

3. The system of claim 2, wherein the dynamic controlling framework further comprises:
    a plug-in framework in communication with the OLSR platform and the link probing tool, wherein the plugin framework is adapted to receive the at least one LQM metric from the link probing tool and to combine one or more LOM metrics with the OLSR platform for leveraging route selection by the OLSR platform.

4. The system of claim 3, wherein the plugin framework implements a HTTP server for accepting HTTP POST messages, wherein each POST message include the at least one LQM metric, at least one link IP address, and at least one local link name.

5. The system of claim 1, wherein the plurality of links has one or both of homogenous or heterogeneous radio links varying in latency and/or bandwidth characteristics.

6. A dynamic controlling framework, comprising:
    a link probing tool in communication with an optimized link state routing (OLSR) platform comprising one or more processors, wherein the link probing tool is adapted to dynamically measure estimated bandwidth, latency, or both estimated bandwidth and latency of active links in the active link database of the OLSR platform;
    a plug-in framework in communication with the OLSR platform and the link probing tool, wherein the plugin framework is adapted to receive at least one link quality multiplier (LQM) metric computed by the link probing tool and to combine the at least one LQM metric with the OLSR platform for enhancing route selection by the OLSR platform; and
    at least one series of pings transmitted via the link probing tool to each active link in the active link database, wherein the link probing tool is adapted to dynamically acquire one of the estimated bandwidth and latency from measuring the round-trip time of the at least one series of pings sent to each active link,
    wherein the dynamic controlling framework further comprises:
    a second series of pings transmitted via the link probing tool to each active link in the active link database, wherein the link probing tool is adapted to dynamically acquire one of the estimated bandwidth and latency from measuring the round-trip time of the second series of pings sent to each active link; and wherein each ping of the at least one series of pings is about 20 bytes in size for dynamically acquiring the estimated latency of each active link, and wherein each ping of the second series of pings is about 20 kilobytes in size for dynamically acquiring the estimated bandwidth of each active link.

\* \* \* \* \*